May 24, 1927.

A. J. FLEITER ET AL

1,629,910

MOLD ENGRAVING MACHINE

Filed March 30, 1926     6 Sheets-Sheet 1

INVENTORS.
ANDREW J. FLEITER.
THEODORE A. MILLER.
BY
ATTORNEY.

May 24, 1927.

A. J. FLEITER ET AL

1,629,910

MOLD ENGRAVING MACHINE

Filed March 30, 1926 6 Sheets-Sheet 5

INVENTORS.
ANDREW J. FLEITER.
THEODORE A. MILLER.
BY
ATTORNEY.

May 24, 1927.

A. J. FLEITER ET AL 1,629,910

MOLD ENGRAVING MACHINE

Filed March 30, 1926      6 Sheets-Sheet 6

INVENTORS.
ANDREW J. FLEITER.
THEODORE A. MILLER.
BY
ATTORNEY.

Patented May 24, 1927.

1,629,910

UNITED STATES PATENT OFFICE.

ANDREW J. FLEITER AND THEODORE A. MILLER, OF AKRON, OHIO, ASSIGNORS TO THE AKRON STANDARD MOLD COMPANY, OF AKRON, OHIO, A CORPORATION OF OHIO.

MOLD-ENGRAVING MACHINE.

Application filed March 30, 1926. Serial No. 98,478.

This invention relates to machines for the purpose of engraving patterns in molds for the curing of rubber articles and particularly to the engraving of non-skid patterns in tire molds. Although the invention is shown as applied to the engraving of pneumatic tire molds, it will be appreciated that the invention may be employed in the engraving of molds for other articles of a similar nature.

The present invention has to do with an improved design of tool carrier and supporting and operating means therefor and is intended to operate as a part of a continuously operated, automatic mold engraving machine such as described and claimed in our copending application, Serial No. 98,477 filed herewith. That application has to do with the automatically operating mechanism for giving the required combined movements of reciprocation to the tool carrier and oscillation to the mold so as to reproduce the desired pattern in the mold. That application also covers the automatic advance or spacing of the units of the pattern about the mold, so that an accurate cutting of the pattern is obtained.

The present invention has for its object a machine particularly designed for the cutting of that portion of the tire design located at the edges of the tread or shoulders of the tire. For this purpose the machine embodies a new and improved form of cutting tool head which is designed so that curved surfaces and straight, non-radial surfaces may be cut in the mold to form the usual shoulders required in present day tire designs. Different tire designers prefer different forms of shoulders at the edges of the tread and the present machine is adapted to form any profile which may be called for.

The numerous advantages and benefits gained from the invention will be appreciated by a complete study of the invention as described herein. The machine, being entirely automatic, is cheaper to operate and gives better and more rapid production than prior machines.

The form of machine illustrated and described herein is one embodiment of the invention only. It will be understood that after the principles of the invention have been made clear to experienced and skilled persons in this art, it is possible to design other forms of machine for accomplishing similar results, which machines will embody specifically different mechanisms without departing from the essential features and principles of the invention as set forth herein and in the claims appended hereto.

In the drawings in which a preferred form of the invention is shown.

Briefly summarized, the operation of the machine is as follows:

The machine is designed especially for the cutting of the continuation of the non-skid pattern in the side of the mold, these parts being cut into the mold and being the reverse of the pattern on the completed tire.

Figure 2:
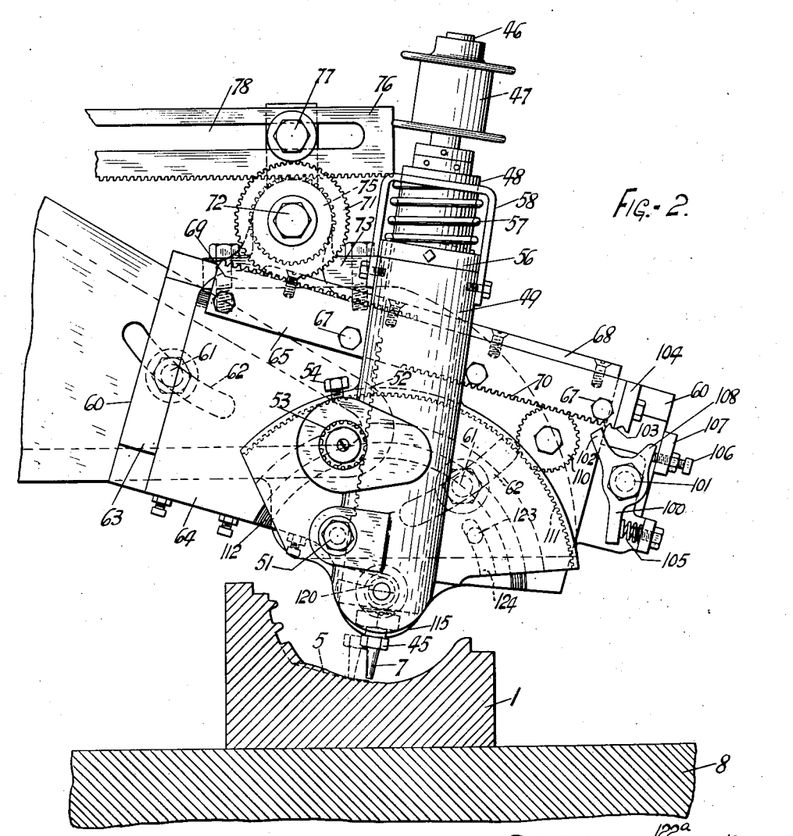
Figure 2 is a side view of the cutting head, illustrating the manner in which the machine is used for cutting a straight shoulder in the side of the mold terminating with a curved surface.
Figures 14, 16:
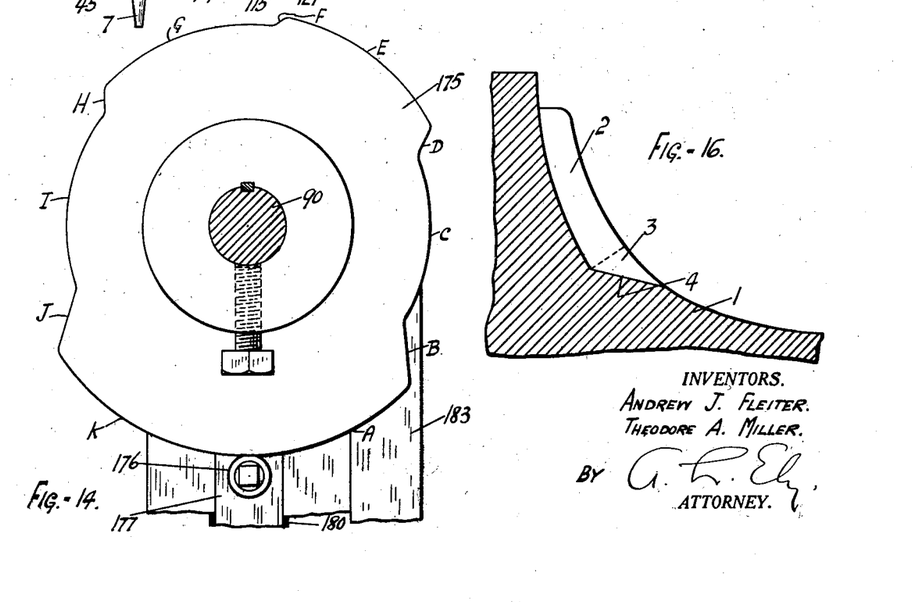
Figure 14 is a plan of a typical cam for controlling the oscillation of the mold.
Figure 16 is a detail showing the portion of the mold at the shoulder of the tread which this machine is designed to remove.

The tire mold is shown at 1. The tread proper is indicated at 2 and is cut out in the machine shown in the copending application referred to above. The region of the metal removed by this machine is indicated at 3 (Figure 16). The bottom of the cavities or recesses cut away by this machine may be along straight lines, as indicated at 4 in Figures 3 and 16, or may be straight and then curved, as shown at 5 in Figure 2, or, as a third variation, may be curved and then straight, as shown at 6 in Figure 4. As a further modification, a curved shoulder may be cut, without any straight lines therein. The construction of the tool head is such that all forms may be cut in the mold. The cutting tool is indicated at 7.

The mold is carried upon a rotary turntable 8 which is given two distinct periods of movement about its axis, the first of which is a period of oscillation during which the tool is performing the cutting operation, the combined oscillation of the mold and movement of the tool radially of the mold causing the tool to travel over a path or series of strokes covering the complete area which is to be cut out in a single unit of the pattern. The second movement of the turntable accomplishes the spacing of the pattern units about the mold which takes place while the tool is inactive. During the second movement, the tool is clear of the mold, in the position shown, for example, in Figure 3.

The detailed mechanism for imparting the various movements to the mold table will not be described in this application as they form the subject matter of the copending application. It will suffice here to say that the required movements of oscillation and advance of the mold table take place automatically in proper timed relation to the reciprocation of the tool head.

While the machine is shown as particularly applied to the cutting out of the shoulders at the side of the tread, the principles may be applied to the cutting of other parts of the mold.

Figure 1:
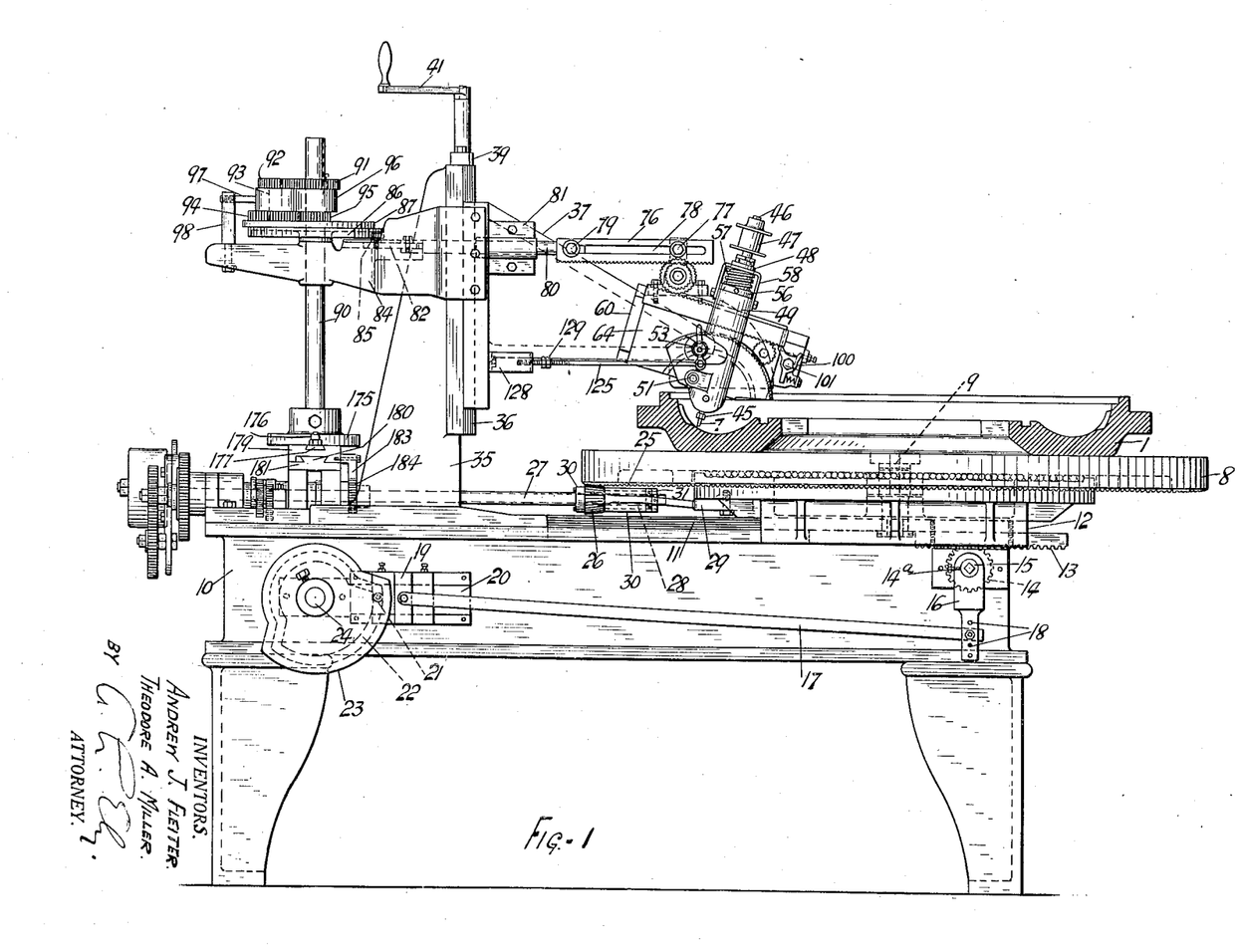
Figure 1 is a side elevation of the complete machine showing a pneumatic tire mold in section, mounted upon the rotating table or mold carriage.

The machine is mounted upon a bed plate 10 upon the upper surface of which at one side of the machine are located parallel guideways 11 upon which is slidably mounted the mold carriage 12 to which the mold table is pivoted on the vertical axis 9. Centrally located on the under side of the mold carriage is a rack 13 which is engaged by a gear 14 mounted upon a transverse shaft 15 which is rotated in bearings in the bed plate. The outer end of the shaft 15 has secured to it by set screw 14ª a rocking arm 16, to the lower end of which is adjustably connected a long link 17, the adjustment being obtained by a plurality of holes 18 for the connection of the link, the holes being spaced at different distances from the shaft. The other end of the link 17 is connected to a reciprocating slide 19 mounted on a horizontal guideway 20 at the side of the bed plate. The face of the slide 19 carries a roller 21 which travels in a track 22 on the inner face of a cam 23. The cam 23 is carried upon a continuously rotating shaft 24. It will be observed that this cam is of configuration to shift the mold carriage toward and from the center of the machine at regular intervals, the forward or outward position of the mold carriage being during the cutting operation and the inward position being during the period in which the mold is being moved to a new cutting position. In this manner the tool may be freed from the mold so that the tool can be advanced to the next area without cutting into the metal. If the pattern is such that the mold is not required to be shifted relative to the tool before the spacing operations, the set screw 14ª is loosened and the arm 16 will idle.

Figures 4, 7, 8, 11:
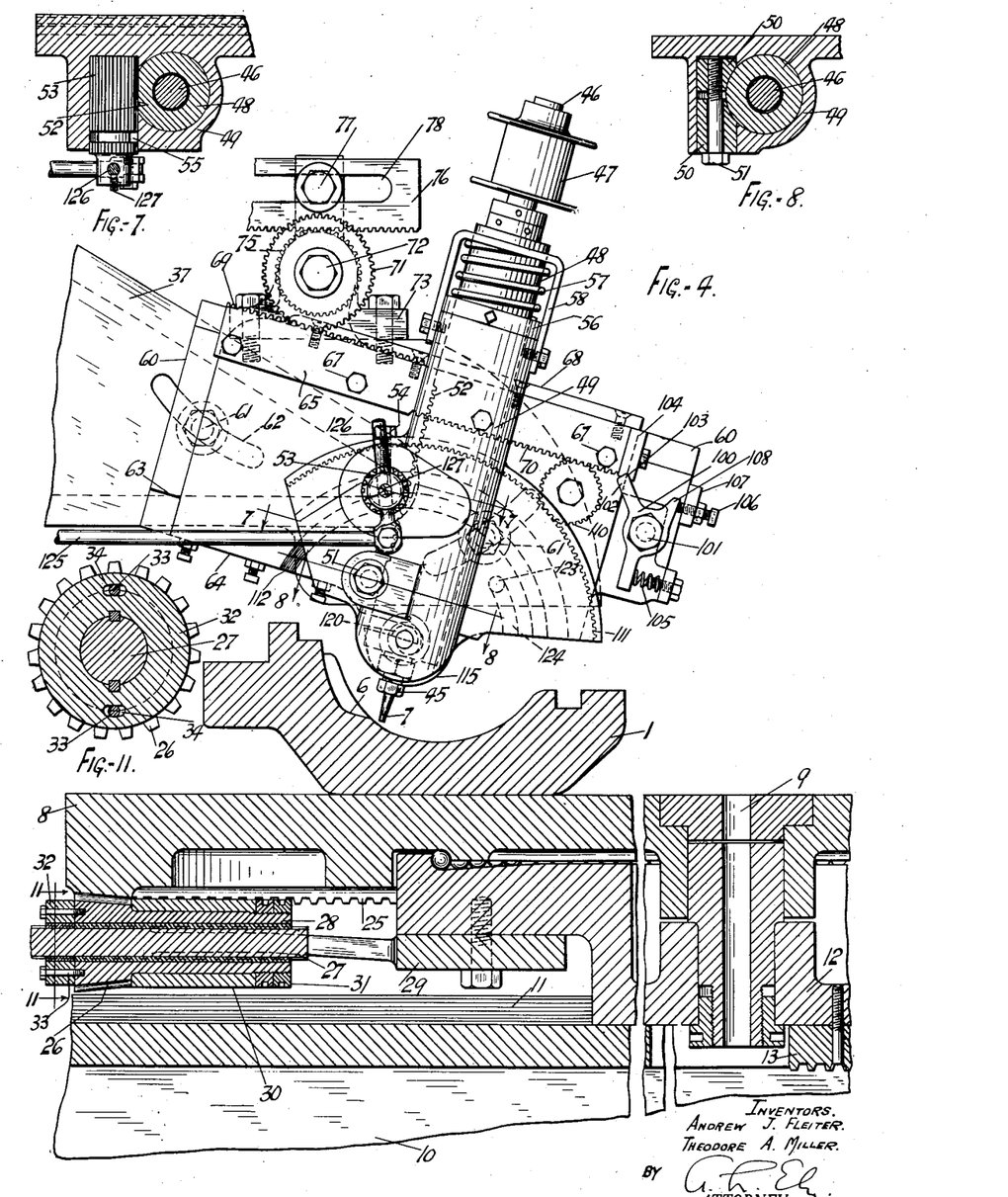
Figure 4 is a side view of the cutting head, illustrating the manner in which the machine is used for cutting a straight shoulder beginning with a curved surface and showing the mold table in section.
Figure 7 is a section on the line 7—7 of Figure 4.
Figure 8 is a section on the line 8—8 of Figure 4.
Figure 11 is a detail on the line 11—11 of Figure 4.
Figure 5:
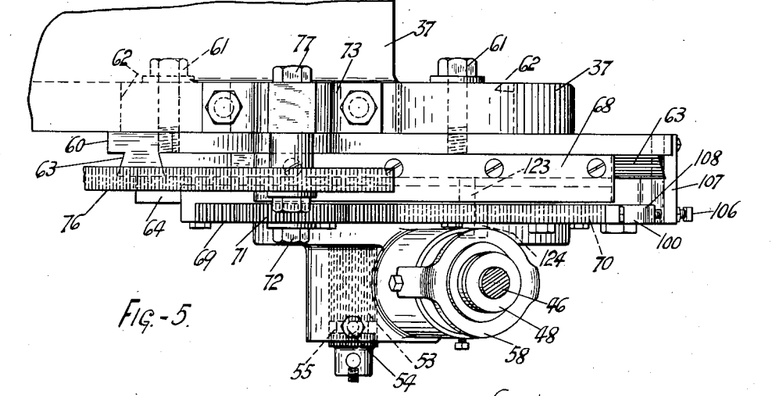
Figure 5 is a plan view of the cutting head.

The turntable 8, upon which the mold is clamped, is mounted upon the carriage 12 on friction reducing bearings and is rotated upon the axis of the mold by means of a large bevel gear 25 on the under side of the turntable, which gear is in mesh with a bevel pinion 26 feathered upon the end of a horizontal shaft 27 (Figure 4). The end of the shaft is slidably received in an elongated sleeve 28 extending from the bevel pinion 26. The sleeve is held in fixed position by a bearing 30 having arms 29 therefrom which are fastened to the under side of the mold carriage. Screw threaded collars 31 confine the bearing upon the sleeve as shown in Figure 4. Wear upon the feather is taken up by means of an adjustable collar 32 surrounding the shaft 27. Bolts 33 pass through slots 34 in the collar and enter the bevel pinion, thereby holding the collar in the position of adjustment thereon. The shaft 27 is permitted to move in and out with the movements of the mold carriage.

The shaft 27 imparts the two movements to the mold which were described above, a series of oscillations while the mold is at the outer extremity of its movement and while the cutting operation is going on, and the other a movement of advancement to a new cutting position which takes place while the mold is retracted or while the tool is inactive.

From one side of the bed plate is erected the vertical standard 35, on one face of which is formed the dovetail way 36 on which is engaged the vertically adjustable head 37, the position of adjustment being controlled by a screw 38. The screw 38 is mounted in a bearing plate 39 at the top of the standard 35 and engages a nut 40 secured to the head 37. A crank 41 is received on the upper end of the screw 38.

The head 37 extends over the mold and serves as a support for the milling tool 7. The tool is secured in the bit 45 at the lower end of an elongated spindle 46, the upper end of the spindle being provided with a pulley 47 which is given a constant, rapid rotation by any suitable flexible driving means. The spindle is mounted in a sleeve 48 mounted in housing 49 so that it can slide therein. If a straight line (Figure 3), or a line which is first straight and then curved (Figure 2), is to be cut, the sleeve is clamped in the housing by two clamping nuts 50 which are drawn into tight clamping relation to the sleeve 48 by a bolt 51.

The sliding of the sleeve 48 to obtain the curvature 6, shown in Figure 4, is obtained, when the nuts 50 are loosened, by means of a rack 52 cut in one side of the sleeve with which is meshed a pinion 53 rotatably mounted in the housing 49, and held in position by a set screw 54 which engages a groove 55 therein. A collar 56 is secured to the sleeve 48 above the housing and a spring 57 between the collar and a bracket 58 secured to the top of the housing maintains the tool spindle at its lowermost point except when the spindle is elevated through the pinion 53 by mechanism to be later described.

Figure 3:
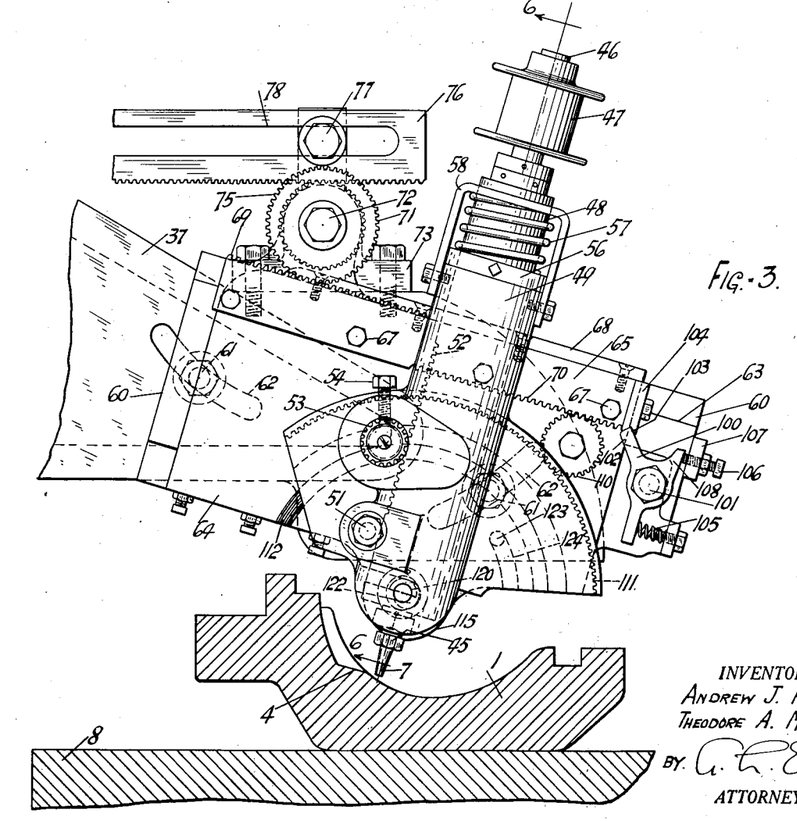
Figure 3 is a side view of the cutting head, illustrating the manner in which the machine is used for cutting a straight shoulder.

The forward end of the head 37 carries a guide plate 60 which is located over the mold and is held in any fixed position of angular adjustment by means of bolts 61 which pass through curved slots 62 in the head and enter the guide plate. The adjustment of the guide plate determines the angle at which the straight cuts, such as shown in Figure 3, are taken in the mold.

Slidably mounted on a dovetailed rib 63 upon the guide plate 60 is the tool carrier plate 64 by means of which the straight line movement is imparted to the tool carrier or spindle. Along the upper edge of the carrier plate 64 is slidably mounted a rack 65 which is angular in cross-section, the vertical portion of the rack lying against the side of the carrier plate 64 and being confined by a dovetailed rib 66, fitting in a correspondingly shaped groove in the face of the plate 64 and held to the rack by bolts 67. A plate 68 is secured to the top of the carrier plate and confines the rack 65 in that direction.

The rack 35 is a double rack, being provided with teeth 69 along its upper face at the rear and with teeth 70 along its lower face at the front. The teeth 69 are engaged by a gear 71 carried upon the end of a shaft 72 which is rotatably mounted in a bracket 73 bolted to the upper edge of the head 37.

The shaft 72 is at the center of curvature of the slots 62 so that it does not interfere with the angular adjustment of the guide plate 60.

A second gear 75 is also secured to the shaft 72 and meshes with a reciprocating rack 76, one end of which rack is supported by a pin 77 passing through a slot 78 in the rack and secured in the bracket 73.

Figure 12:
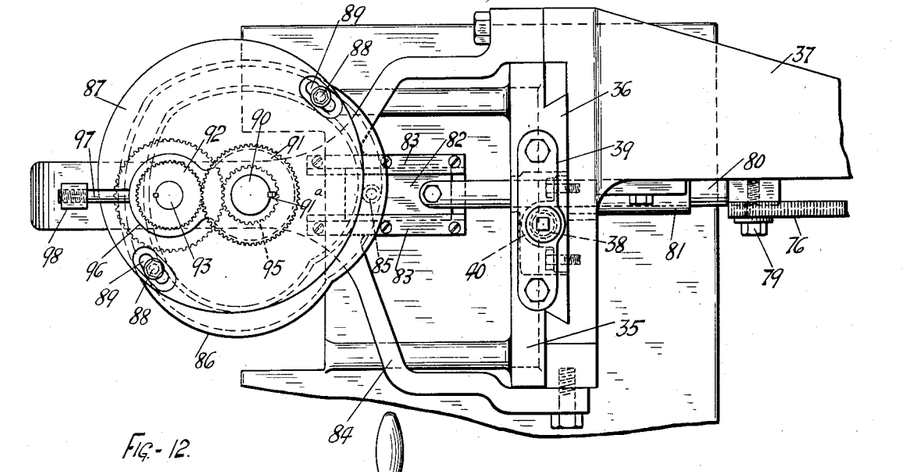
Figure 12 is a plan view of the cam for reciprocating the tool head.
Figure 13:
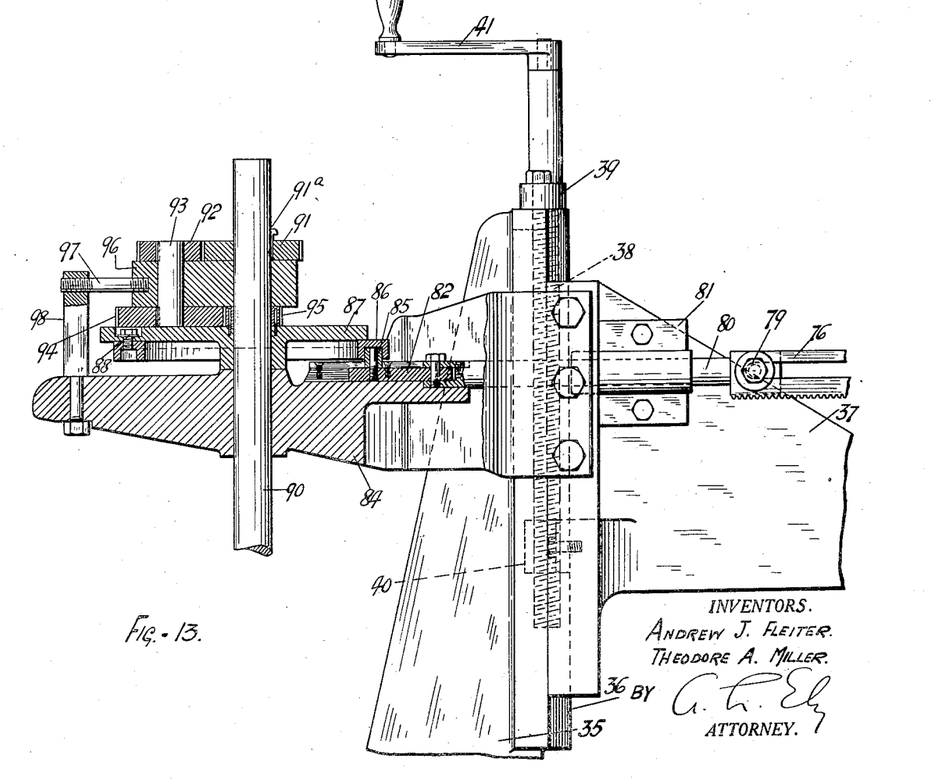
Figure 13 is a side view of the parts shown in Figure 12, certain of the parts being in section.

Referring to Figures 12 and 13, it will be observed that the rear end of the rack is attached by the adjustable pivot 79 to a bar 80 which slides in a guide plate 81 attached to the head 37. The bar 80 passes through the standard 35 and it attached to a slide 82 which reciprocates in guideways 83 formed on the upper surface of a bracket 84. The bracket 84 is provided with arms which are secured to the vertically adjustable head 37 and is movable therewith. A roller 85 rides in the track of a heart-shaped cam 86 which is adjustably secured to a cam disk 87 by means of bolts 88 which pass through slots 89 in the cam disk.

The cam disk is driven from the upper end of a vertical cam shaft 90 which is intermittently rotated, the rotation of the shaft 90 being stopped while the mold is spacing, that is, moving forward for the next cut. The shaft 90 rotates in the bracket 84 and in the cam disk 87. It carries at its upper end a pinion 91 which is keyed to the shaft 90 by an elongated keyway 91$^a$ which permits the adjustment of the bracket 84. The pinion 91 meshes with an idler pinion 92 carried on a short shaft 93. The lower end of the shaft 93 carries a gear 94 which meshes with a small pinion 95, loose on the shaft 90 but fastened to the cam disk 87. The shaft 93 is rotated in a bearing piece 96 which is anchored by pin 97 to a post 98 secured in the projecting end of the bracket 84. The gearing just described operates to reciprocate the plate 64 upon the guide plate 60 through the connection of the rack 76, the gearing 75 and 71 and the rack 65 the requisite number of times to obtain the cutting operation required in a single unit of the pattern.

When the cutting tool is performing the cuts shown in Figures 3 and 4, the rack 65 is fixed with respect to the tool carrier plate and moves with it, and for maintaining such fixed relation a three-pronged dog 100 is provided. This dog is pivoted on a pin 101 carried on the forward end of the sliding carrier plate 64. A finger 102 of this dog engages a notch 103 in the lower face of a plate 104 secured to the end of the rack 65, so that while the dog is engaged in the notch there can be no movement of the rack upon the carrier plate. A light spring 105 maintains the dog in engaged position except when an adjustable screw 106, which is carried in a bracket 107 in the guide plate 60, strikes a finger 108 formed on the dog, whereupon the dog is rocked about the pivot and the rack is released and is free to move upon the carrier plate. The location and adjustment of the screw 106 is so regulated that the disengagement of the dog and the rack will take place as the tool reaches the curved portion of the cut 5 shown in Figure 2.

The rack teeth 70 on the rack 65 engage an idler pinion 110 which is mounted on the carrier plate, and this idler pinion engages a segmental gear or sector 111 which is secured to the back of the spindle housing 49. The carrier plate 64 is provided with a curved rib 112 which is concentric with the gear 111 and which is received within a curved channel 113 on the back of the housing.

Figures 6, 15:
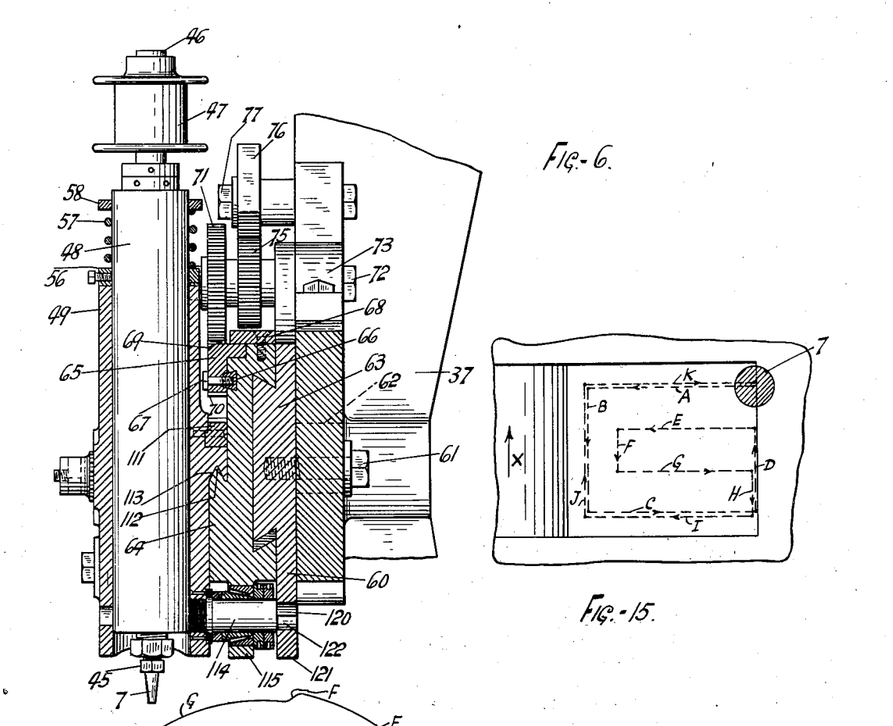
Figure 6 is a vertical section through the tool spindle on the line 6—6 of Figure 3.
Figure 15 is a view showing the path of the tool as generated by the cam of Figure 12 and the oscillation of the mold.
Figure 9:
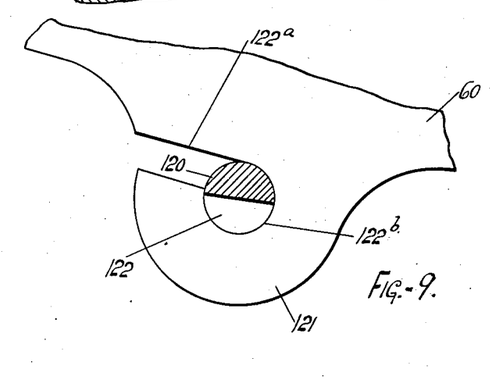
Figures 9 and 10 are details of the pivot pin for the tool head.
Figure 10:
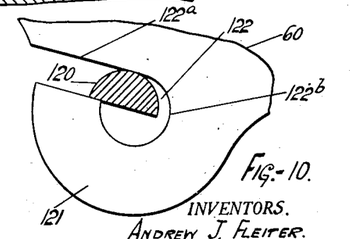

The center of the curved rack and the curved channel is located at the axis of a bearing pin 114 which is fixed in the housing and is received in bearing 115 located in the carrier plate 64 (Figure 6). The pin 114 is provided with an extension 120 which is semi-circular, as shown in Figures 9 and 10, and is received within a slot or recess formed in an ear 121 integral with the guide plate 60. The recess is designated by the numeral 122 and is formed with a straight portion 122$^a$ and a circular portion 122$^b$ communicating therewith. When the tool carrier is moving in a straight line to make a straight cut, the semi-circular pin 120 reciprocates in the straight portion of the slot 122 as shown in Figure 10. When the tool carrier is to be oscillated to make the curved cut, the pin 120 rotates in the circular portion 122$^b$ of the slot (Figure 9). To prevent rocking of the tool to the left beyond its proper position, a pin 123 is fastened in the carrier 64 and projects into a curved slot 124 on the rear of the sector plate 111. This permits the sector to rock in the one direction only.

A curved cut just prior to the straight cut is imparted by bodily reciprocation of the spindle sleeve in the housing which is imparted by the pinion 53 previously described. This pinion is actuated by means of a rod 125, the forward end of which is pivotally connected to a pin 126 which is passed through the hub of the pinion 53, being adjustably secured in position by a set screw 127. The rear end of the link 125 reciprocates in a bracket 128 attached to the vertically adjustable head 37. Adjustable nuts 129 on the rod 125 strike against the bracket 128 on the return stroke of the head and cause the sleeve 48 to reciprocate at the end of the cutting stroke, which, through the rotation of the pinion 53, gives the desired curvature at the beginning of the cutting stroke.

In order to cut the proper pattern in the mold, two factors are required. The first is the reciprocation or oscillation, or combined reciprocation and oscillation of the tool carrier over the surface of the mold. The other factor is the oscillation of the mold about its center during the cutting operation. The first factor is controlled by the cam 86 through the mechanism which has been described in connection with the head. The second factor is controlled through the rotation of the bevel pinion 26 by mechanism which forms the subject matter of the copending case referred to above. It is sufficient to say that the mold is oscillated at definite stages and to definite extents while the cutting tool is operated. Any path may be given to the tool by requisite changes in the controlling mechanism and any pattern may be reproduced. A simple pattern has been selected for the purposes of illustration herein. The path of the tool is illustrated in Figure 15 where the cutting of a square recess in the mold is illustrated.

In this figure, the tool 7 is illustrated in section at the start of the cutting operation. The first stroke is the line A, which for the purposes of illustration is shown as horizontal, although as appled to the mold it will be a radial line. This horizontal line is cut while the mold is stationary and by the reciprocation of the tool carrier. The next cut is circumferentially of the mold and is indicated by the vertical line B. This takes place while the tool is stationary and the mold is rotated in the direction of the arrow X. The next cut is the radial cut C, which is done while the mold is stationary and the cutter is reciprocated in the opposite direction. Then the circumferential movement D is made by rotation of the mold in the opposite direction. These four cuts remove a band around the figure, leaving an island of metal in the center of the figure which must be cut away. Then the cuts E, F and G are made in the same manner and cut out of the center of the figure. The movement H takes place and then the finishing cuts I, J and K are taken about the figure and finish the edges of the recess, bringing the tool back to its starting point. The tool carriage is now stopped by the cessation of rotation of the shaft 90 and a continued rotation of the mold moves the tool 7 on to its starting position for the next figure.

It will be observed that all of the described lines of travel of the tool are straight. Obviously, by proper correlation of the mold rotating and tool reciprocating mechanisms, curved or diagonal lines may also be cut.

The tool in its starting position may be free of the mold if desired and the movements D and H may not be cutting movements. If it is necessary to have the tool clear the mold during the spacing operation, the carriage shifting mechanism illustrated in the rack 13 and the gear 14, controlled by the cam 23, is useful to clear the tool from the mold.

The mold table is oscillated about its axis 9 during the cutting operation by means of a cam 175 secured to the lower end of the shaft 90 and therefore rotating with the cam 86. In Figure 14 is shown the detailed construction of the cam 175 which is designed, in cooperation with the cam 86, to obtain the path of movement of the tool illustrated in Figure 15.

Thus the surfaces A, C, E, G, I and K, which are concentric, give the required dwell in the oscillation of the mold to enable the tool to be reciprocated by the cam 86, while the surfaces B, D, F, H and J come during the pauses of the cam 86 and impart the oscillation to the mold.

Against the surface of the cam 175 bears a roller 176 which is carried on a plate 177 secured to a slide 179 which reciprocates upon a dovetailed guideway 180 formed on the upper surface of a bridge piece 181 which is supported upon the bed plate.

To the side of the slide 179 is attached an angular rack 183 having teeth on its underside which engage a pinion 184 on the shaft 27 and intermittently connected to the shaft by clutch mechanism (not shown).

It is believed that the operation of the machine will have been made clear from the description which has been set forth. The pattern is obtained by the relative movements of the tool and the mold about a single area of the mold cavity. The cross-section of the mold cavity, or the contour of the shoulder, is determined by the setting of the head, and any desired contour can be obtained as will be understood from the detailed description which has been given.

Changes and modifications may be made in adapting the principles of the invention to various forms of work required, and alterations and variations thereof are within the skill of the usual mechanic in the designing of similar machines. The claims are, therefore, not limited to the exact design shown herein, but may be given as liberal an interpretation as permissible by the state of the art.

What is claimed is:

1. In a machine for cutting tire molds, a head which projects over the mold, a guide plate adjustable at varying angles on the head, a tool carrier movable upon the guide plate, a pivot for the tool carrier, and means for moving the carrier in a straight line upon the guide plate and then about said pivot in a continuous movement.

2. In a machine for cutting tire molds, a head which projects over the mold, a guide plate adjustable at varying angles on the head, a tool carrier movable over the guide plate, a tool housing pivoted on the carrier, means for actuating said parts, the carrier and the housing being locked for a portion of the movement and released for the balance thereof so that the tool will cut a straight line and a curve in a single stroke.

3. In a machine for cutting tire molds, a head which projects over the mold, a guide plate on the head, a tool carrier movable upon the guide plate, a pivot for the tool carrier, and means for moving the carrier in a straight line upon the guide plate and then about said pivot in a continuous movement.

4. In a machine for cutting tire molds, a head which projects over the mold, a guide plate on the head, a tool carrier movable over the guide plate, a tool housing pivoted on the carrier, and means for actuating said parts, the carrier and the housing being locked for a portion of the movement and released for the balance thereof so that the tool will cut a straight line and a curve in a single stroke.

5. In a machine for cutting tire molds, a head projecting over the mold, a guide plate secured to the head, a carrier plate movable in the guide plate, a tool housing pivoted on the carrier plate, and actuating means to reciprocate the carrier plate and then rock the tool housing at a single stroke of the actuating means.

6. In a machine for cutting at a single stroke a straight line and a curved continuation thereof in a tire mold, a tool movable across the mold, and means for reciprocating the tool and for rocking the tool about a center at the termination of the reciprocating movement.

7. In a machine for cutting at a single stroke a straight line and a curved continuation thereof in a tire mold, a tool movable across the mold, and means for reciprocating the tool and for rocking the tool about a center at one end of the reciprocating movement.

8. In a machine for cutting tire molds, a head projecting over the mold, a guide plate on the head, a carrier plate movable along the guide plate, a pin on the carrier, a housing pivoted on the pin, an actuating mechanism for the carrier plate, and means automatically operative to translate the movement imparted by the actuating mechanism from a straight line movement on the guide plate to a pivotal movement about the pin.

9. In a machine for cutting tire molds, a head projecting over the mold, a guide plate on the head, a carrier plate movable along the guide plate, a pivot on the carrier, and a housing on the pivot, the pivot extending into the guide plate where it is received in a slot parallel with the plate, the slot terminating in an enlargement in which the pin may rock.

10. In a machine for cutting tire molds, a head projecting over the mold, a guide plate on the head, a carrier plate movable along the guide plate, a pivot on the carrier, and a housing on the pivot, the pivot having a flattened extension extending into the guide plate where it is received in a slot parallel with the plate, the slot terminating in an enlargement in which the pin may rock.

11. In a machine for cutting tire molds, a head projecting over the mold, a guide plate on the head, a carrier plate movable along the guide plate, a rack slidably mounted on said carrier plate, a gear meshing with the rack, means to oscillate the gear, a sector pivoted on the carrier, said sector being driven by the rack, a tool housing on the sector, and means to lock the rack for movement with the carrier or release it for movement upon the carrier.

12. In a machine for cutting tire molds, a head projecting over the mold, a guide plate on the head, a carrier plate movable along the guide plate, a rack on the carrier plate, a sector pivoted on the carrier and driven by the rack, and means to lock the rack for unitary movement with the carrier plate or release it for movement independent thereof.

13. In a machine for cutting shoulders at the edge of a tread in a tire mold, an angularly arranged guideway, a carrier movable over the guideway, a tool pivotally mounted on the carrier, an actuating mechanism, and means acting during the cutting operation to change the movement of the tool from a straight line movement on the guideway to a pivotal movement.

14. In a machine for cutting shoulders at the edge of a tread in a tire mold, an angularly arranged guideway, a carrier movable over the guideway, a tool pivoted on the carrier, a lock to prevent pivotal movement of the tool on the carrier, and means to release the lock at a definite point in the movement of the carrier over the guideway.

15. In a machine for cutting tire molds, a guideway, a carrier movable over the guideway, a tool pivoted on the carrier, a lock to prevent pivotal movement of the tool on the carrier, and means to release the lock at a definite point in the movement of the carrier over the guideway so that it may rock about its pivot.

16. In a machine for cutting tire molds, a guideway, a carrier movable over the guideway, a tool pivoted on the carrier, a lock to prevent pivotal movement of the tool on the carrier, means to release the lock at a definite point in the movement of the carrier over the guideway so that it may rock about its pivot, and a single actuating mechanism for moving the carrier over the guideway and the tool about its pivot.

17. In a machine for cutting tire molds, a head projecting over the mold, a tool carrier movable over the mold, a tool housing on the carrier, a spindle within the housing, and means to move the spindle longitudinally during the movement of the carrier, said means including a rack on the spindle, a pinion in mesh with the rack, a fixed abutment, and a link connected with the pinion and arranged to contact the abutment to oscillate the pinion at periods of movement of the carrier.

ANDREW J. FLEITER.
THEODORE A. MILLER.